United States Patent [19]

Jost

[11] Patent Number: 5,261,506
[45] Date of Patent: Nov. 16, 1993

[54] CONTROL DEVICE FOR AN OCCUPANT SAFETY DEVICE OF MOTOR VEHICLES

[75] Inventor: Michael Jost, Unterschleissheim, Fed. Rep. of Germany

[73] Assignee: Bayerische Motoren Werke AG, Fed. Rep. of Germany

[21] Appl. No.: 778,991

[22] PCT Filed: Apr. 25, 1990

[86] PCT No.: PCT/EP90/00666
 § 371 Date: Jan. 23, 1992
 § 102(e) Date: Jan. 23, 1992

[87] PCT Pub. No.: WO90/13456
 PCT Pub. Date: Nov. 15, 1990

[30] Foreign Application Priority Data

Apr. 28, 1989 [DE] Fed. Rep. of Germany ....... 3914053

[51] Int. Cl.⁵ .................................................. B60K 28/12
[52] U.S. Cl. ..................................... 180/282; 280/735; 280/806
[58] Field of Search ............... 280/734, 735, 806; 180/282

[56] References Cited

U.S. PATENT DOCUMENTS

| | | | |
|---|---|---|---|
| 3,853,331 | 12/1974 | Jones | 280/735 |
| 4,693,485 | 9/1987 | Kamei et al. | 280/707 |
| 4,715,468 | 12/1987 | Baumann et al. | 280/756 |
| 4,819,960 | 4/1989 | Breed | 280/734 |
| 5,029,473 | 7/1991 | Jost et al. | 33/366 |

FOREIGN PATENT DOCUMENTS 2047516 12/1980 United Kingdom .

Primary Examiner—Margaret A. Focarino
Assistant Examiner—Paul Dickson
Attorney, Agent, or Firm—Evenson, McKeown, Edwards & Lenahan

[57] ABSTRACT

In a control device for a passenger safety apparatus, the safety apparatus is triggered by a sensor arrangement which responds to a longitudinal and/or transverse acceleration of the motor vehicle. It is also independently triggerable by an additional state-of-motion or moving-condition sensor which is configured to recognize a near weightless state of the vehicle. The safety apparatus is triggered even in an extremely critical state of motion in which the vehicle moves in a manner similar to free fall.

8 Claims, 1 Drawing Sheet

CONTROL DEVICE FOR AN OCCUPANT SAFETY DEVICE OF MOTOR VEHICLES

BACKGROUND OF THE INVENTION

The present invention relates to a control device for a motor vehicle occupant safety apparatus and, more responsive to longitudinal and/or transverse acceleration.

Control devices for the triggering of air bags, roll-over bars and the like are generally known. They respond when the measured acceleration exceeds the limit which is customary during a noncritical operation of the motor vehicle. The values involved may be absolute values or the duration of the measured acceleration as well as combinations of values and duration of this acceleration.

However, in the case of these known control devices, the safety device is, as a rule, not triggered when the motor vehicle is in a particularly critical condition. This critical condition will occur when the motor vehicle loses contact with the road by, for example, crashing downward.

The present invention is based on an object of providing a control device which triggers the occupant safety device particularly when the motor vehicle is in a particularly critical situation.

The invention achieves this object by providing an additional moving-condition sensor to trigger the safety apparatus independently of the acceleration sensor when the motor vehicle approaches a weightless condition.

In the case of weightlessness, such as arises from free fall the acceleration values in the motor vehicle are relatively low. Nevertheless, the safety device must already be triggered during the free fall since extremely high acceleration values frequent occur at the end of the weightless condition (impact). The present invention that the safety device to become operative already during the weightless condition in order to thus provide a sufficient protection for the vehicle occupants at the end of the weightlessness condition.

Since a condition of the motor vehicle which approaches weightlessness occasionally occurs during the normal driving operation, a further feature of the present invention differentiates between such "normal" and "critical" situations. In order to avoid an unnecessary triggering of the safety device in situations of this type which occur, for example, when driving over a hilltop, the duration of the critical condition is determined by a time function element. When this duration is short, that is, the critical condition is very brief with respect to time, the occupant safety device is not triggered. The circuit devices required for achieving this feature of the invention include connecting a time-function element behind the moving-condition sensor.

During the condition of weightlessness, a distance measuring sensor determines a distance from the ground which is clearly above the normal value. During the weightless condition, the sensor furnishes a value close to zero. Finally, the rebound of one or several of the vehicle wheels, when it is equal to the maximally possible value, is also a good indication of the condition of weightlessness.

Although a safety device for a roll-over bar of a motor vehicle is known from German Patent Document DE-PS 35 45 874 which is controlled by a rebound sensor, in contrast to the present invention, the free fall condition is not taken into account because the signal of the wheel rebound sensor will only have an effect when a tilt switch responds at the same time which is actuated when a certain tilt is exceeded. However, during the weightless condition, there is frequently no functional connection with the tilt of the vehicle.

Figure 1:
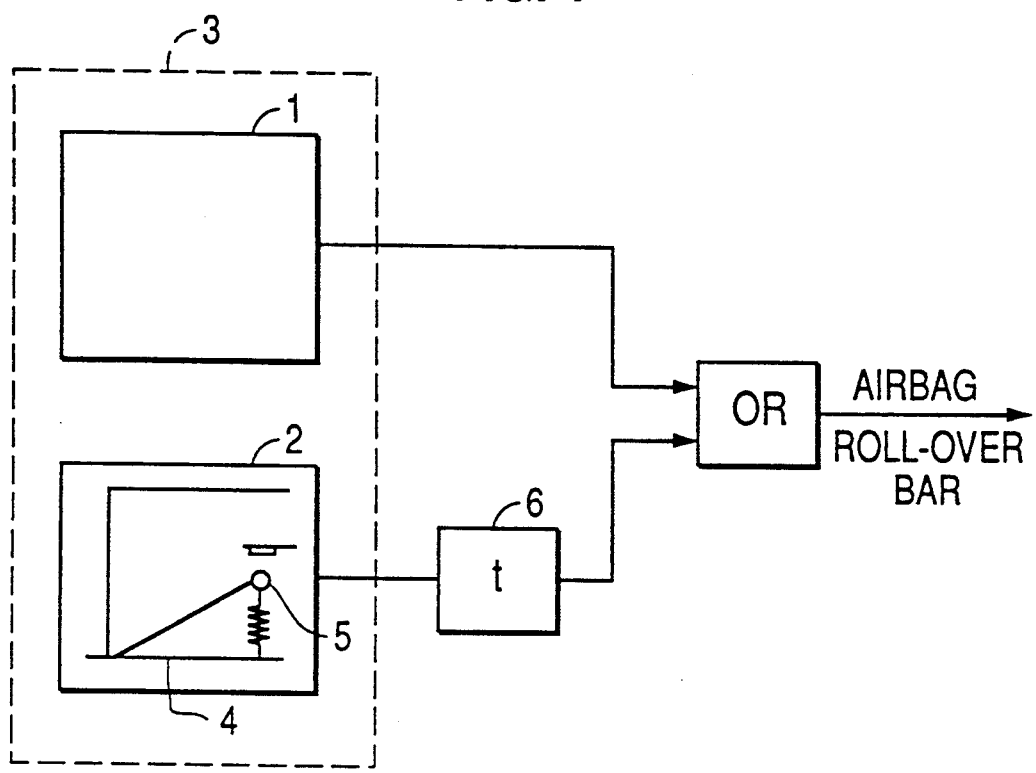
FIG. 1 is a drawing figure which is a schematic circuit for a control device for actuating an occupant safety system.
Figure 2:
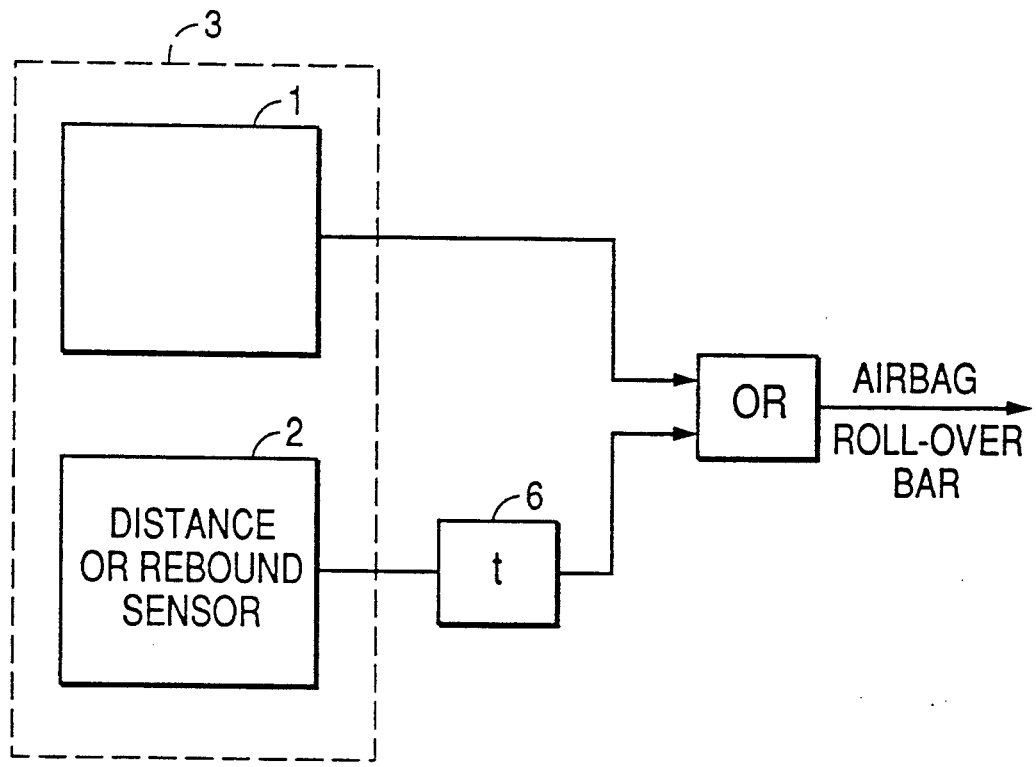
FIG. 2 is a schematic circuit for another embodiment of a control device for actuating an occupant safety system.

Other objects, advantages and novel features of the present invention will become apparent from the following detailed description of the invention when considered in conjunction with the accompanying drawings.

DETAILED DESCRIPTION OF THE DRAWINGS

The drawing shows a control device in accordance with the present invention for an occupant safety device which can be triggered by a sensor device 1 and can, independently of it, be triggered by a moving-condition sensor 2. This is alternative triggering is symbolized by an OR-function element.

The safety device is, for example, a known air bag or a roll-over bar (not shown) of a motor vehicle. The sensor device 1 may, for example, be constructed as described in German Patent Application with the official German File Number P 38 15 938.4 or may consist of one or several level tubes. However, it is also possible to use any other known construction, and to determine the transversal acceleration or the rotational condition by movable mass bodies.

The moving-condition sensor 2 may, for example, respond to the vertical acceleration of the motor vehicle and, together with the sensor device 1, may be integrated in a common housing 3. In the simplest case, the sensor 2 is a scale 4 by which the weight of the mass body 5 is determined.

During normal driving conditions, the scale 4 indicates a value which fluctuates around the value of the actual weight. The fluctuations are caused by temporary, relatively slight vertical accelerations which the motor vehicle experiences during the driving operation.

When the motor vehicle loses the contact with the ground, a moving condition occurs which is at least similar to that of weightlessness. The scale 4 now furnishes a value which, in the ideal case, that is, in the undisturbed free fall, is equal to zero or is around this value within a small value range.

The control device therefore recognizes the condition of weightlessness. When this conditions lasts for a specific time period, for example, 100 msecs, the control device triggers the air bag or the roll-over bar and renders it operative. The given time period is determined by a time function element 6 through which the output signal of the scale 4 is guided.

The triggering of the safety device by the moving-condition sensor 2 takes place independently of the possible triggering by the acceleration sensor 1 and therefore also when the latter determines no critical value of the measured acceleration. Thus, it is ensured that under all possible moving conditions of the motor vehicle, the safety device is timely triggered and therefore carries out its function reliably.

Instead of the illustrated scale-like driving-condition sensor 2, a distance sensor, (not shown), which determines the distance of the motor vehicle from the road surface, or a wheel rebound sensor, and responds in the case of a maximally rebound vehicle wheel, may also be used for recognizing that the vehicle has lost contact with the road or has still only a very slight contact with the road which approaches the condition of the free fall.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A control device for an occupant safety device of motor vehicles, comprising a sensor device responding to at least one of longitudinal and transversal acceleration for triggering the safety device, and an additional moving-condition sensor which solely and independently of the sensor device triggers the safety device only when the motor vehicle is in a substantially weightless condition for a specific time period.

2. The control device according to claim 1, wherein a time function element is connected behind the moving-condition sensor, and the safety device is configured to be triggered when the vehicle is in the substantially weightless condition for longer than a switching time of the time function element.

3. The control device according to claim 1, wherein the moving-condition sensor is a distance sensor which determines a distance of the motor vehicle from a road surface.

4. A control device according to claim 1, wherein the moving-condition sensor responds to vertical acceleration.

5. The control device according to claim 1, wherein the moving-condition sensor is a wheel rebound sensor.

6. The control device according to claim 2, wherein the moving-condition sensor is a distance sensor which determines a distance of the motor vehicle from a road surface.

7. A control device according to claim 2, wherein the moving-condition sensor responds to vertical acceleration.

8. The control device according to claim 2, wherein the moving condition sensor is a wheel rebound sensor.

* * * * *